US006531208B2

(12) United States Patent
Chung

(10) Patent No.: US 6,531,208 B2
(45) Date of Patent: Mar. 11, 2003

(54) DISSOLUTION TYPE THERMAL TRANSFER FILM FOR THREE DIMENSIONAL PATTERNS AND METHOD FOR MANUFACTURING THE SAME

(75) Inventor: Sook Hee Chung, Suwon-Si (KR)

(73) Assignee: Korea Chemical Co., Ltd., Kyongki-do (KR)

( * ) Notice: Subject to any disclaimer, the term of this patent is extended or adjusted under 35 U.S.C. 154(b) by 94 days.

(21) Appl. No.: 09/846,908

(22) Filed: May 1, 2001

(65) Prior Publication Data

US 2002/0025411 A1 Feb. 28, 2002

(30) Foreign Application Priority Data

Aug. 23, 2000 (KR) ........................................ 2000-48803

(51) Int. Cl.$^7$ ............................ B32B 27/14; B32B 3/00

(52) U.S. Cl. ........................ 428/207; 428/208; 428/209; 428/480; 428/500; 428/914

(58) Field of Search ................................. 428/207, 208, 428/209, 206, 480, 500, 914

(56) References Cited

U.S. PATENT DOCUMENTS 5,928,989 A 7/1999 Ohnishi et al. ............. 503/227
5,994,028 A 11/1999 Lee ......................... 430/273.1

OTHER PUBLICATIONS

Korea, Laid–Open 2001–0000283, Treansfer Paper Manufacturing Apparatus for Spry Pattern and Transfer Paper Manufactured by Said Transfer Paper Manufacturing Apparatus, Jan. 5,2001.*

DWPI 2002–128848, Fusible Heat Transfer Paper for Forming 3–Dimentional Pattern and Method for Preparing the Same, Jul. 27, 2001.*

DWPI 2001–438226, Partially Dissolved Heat Transfer Paper for 3D Desinging and its Preparation, Feb. 28, 2002.*

* cited by examiner

*Primary Examiner*—Cynthia H. Kelly
*Assistant Examiner*—B. Shewareged
(74) *Attorney, Agent, or Firm*—Merchant & Gould P.C.

(57) ABSTRACT

In the present invention concerning a dissolution type thermal transfer film for three dimensional patterns and a method for manufacturing the same film, the simplification and speed of a pollution-free dry printing process and various types of decoration are achieved by transferring the thermal transfer film according to the invention to an article to be decorated made of wood or plastic molded material only with the use of heat and pressure and by subsequently forming a desired decoration in three-dimensional pattern through two dissolution processes, wherein the thermal transfer film comprises a base film consisting of polyester, polypropylene or polyvinylchloride without a mat agent or coated with a mat agent to provide a unglazed film, an optional releasing layer based on acrylic resin as the main component having separability to be mounted on the top of the base film, a print layer made of a water-soluble acryl-based resin, or water-soluble or alcoholic vinyl-based resin having dissolving power on the top of the optional releasing layer, a metal powder-printed layer or metal vapor-deposited layer, a thermosetting protective layer, a secondary acryl-based print layer and finally an adhesive layer coated in that order.

1 Claim, 2 Drawing Sheets

DISSOLUTION TYPE THERMAL TRANSFER FILM FOR THREE DIMENSIONAL PATTERNS AND METHOD FOR MANUFACTURING THE SAME

FIELD OF THE INVENTION

The present invention relates to a dissolution type thermal transfer film for three dimensional patterns and a method for manufacturing the same, which allow the formation of ornamental three dimensional patterns with an improved performance based on the step of directly transferring the thermal transfer film already made to the object of interest and a subsequent step of partially dissolving the transferred film, and further to a process wherein a base film of polyester, polypropylene or polyvinylchloride or a base film of the same kind but unglazed through coating with a mat agent is laminated with various functional layers through the dry printing process and transferred to the surface of wood or plastic molded material to form three dimensional patterns with the help of two auxiliary dissolving steps.

BACKGROUND OF THE INVENTION

Generally, in case that the decorative work is conducted for the articles including picture frames, furniture, interior parts and the like made of wood or plastic molded material, the formation of three dimensional patterns on the surfaces of those articles is achieved through a serial operations including repeated paintings, dryings and dissolutions. Specifically, the base color is primarily coated on a frame, another color is coated on the primary color and so on, then the coated colors are dried and subsequently the colors are partially removed or dissolved to form desired three dimensional or raised patterns. This process involves a fundamental problem because the coating operations including the partial dissolving operation should be conducted manually and so excessive working time is required due to the complexity and tediousness of the operation, the efficiency of production is low together with the increased cost and furthermore there is a limitation in providing a variety of designs and patterns.

Accordingly, there has been a continuous demand for a proposal of measure for a variety of patterns and enhanced work efficiency.

SUMMARY OF THE INVENTION

The invention was created to resolve the above-described problem with the conventional art in connection with coating of a paint and removing of the dried color coating and the object of the invention is to provide a thermal transfer film for three dimensional patterns and a method for manufacturing the same film wherein the formation of three dimensional patterns is very easily achieved, working time is shortened with the reduced manpower to result in markedly reduced manufacturing cost due to the increased efficiency and moreover a variety of high-valued three dimensional patterns and designs are realized, based on the basic idea of substantially dry printing of thermal transfer films in a process of direct thermal transfer to the articles to be decorated by using only heat and pressure, followed by dissolving the unwanted portions out from the printed plastic film by taking the advantage of the property of a solvent capable of dissolving a plastic.

The object is achieved according to an aspect of the invention by transferring the thermal transfer film according to the invention in dry state to an article to be decorated made of wood or plastic molded material only with the use of heat and pressure and by subsequently forming a desired decoration in three-dimensional pattern through two dissolution processes, wherein the thermal transfer film comprises a base film consisting of polyester, polypropylene or polyvinylchloride without a mat agent or coated with a mat agent to provide a unglazed film, an optional releasing layer based on acrylic resin as the main component having separability to be mounted on the top of the base film, a print layer made of a water-soluble acryl-based resin, or water-soluble or alcoholic vinyl-based resin having dissolving power on the top of the optional releasing layer, a metal powder-printed layer or metal vapor-deposited layer, a thermosetting protective layer, a secondary acryl-based print layer and finally an adhesive layer coated in that order.

The object is also achieved according to another aspect of the invention by a method for manufacturing a thermal transfer film for three dimensional patterns, which comprises the steps of: coating the acryl-based resin, as the main component, by using ketone-based solvent, acetate-based solvent or toluene to form a releasing layer, on a base film consisting of polyester, polypropylene or polyvinylchloride without a mat agent or coated with a mat agent to provide a unglazed film; on the releasing layer, coating the primary print layer consisting of an ink made from a water-soluble acryl-based resin, or water-soluble or alcoholic vinyl-based resin together with a dyestuff, methanol, ethanol, IPA and water; on the primary printed layer, coating a metal powder ink or vapor-depositing a thin metal layer in vacuum; on the metal layer, coating a protective layer of acryl-based resin or acrylicurethane-based resin together with ketone-based solvent, acetate-based solvent, toluene, alcohol solvent and curing agent, as the layer for preventing the under-laid print layer from dissolving; on the protective layer, coating a secondary print layer; and coating an adhesive layer for adhesion with an article to be joined.

Further characteristics and advantages of the invention will be evident from the following detailed description.

DETAILED DESCRIPTION OF THE INVENTION

The dissolution type transfer film for three dimensional patterns and the method for manufacturing the same film will be described in detail along with a preferred embodiment in conjunction with the accompanying drawings.

Figure 1:
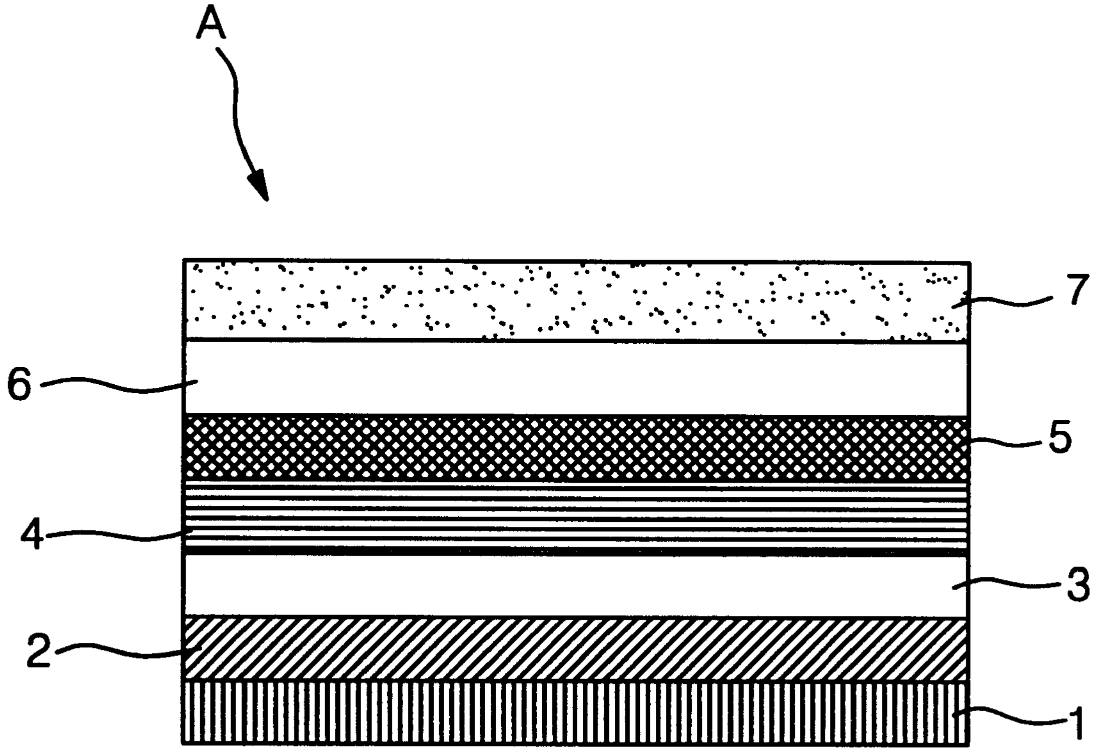
FIG. 1 shows the enlarged longitudinal cross section of a dissolution type thermal transfer film according to the invention.
Figure 2:
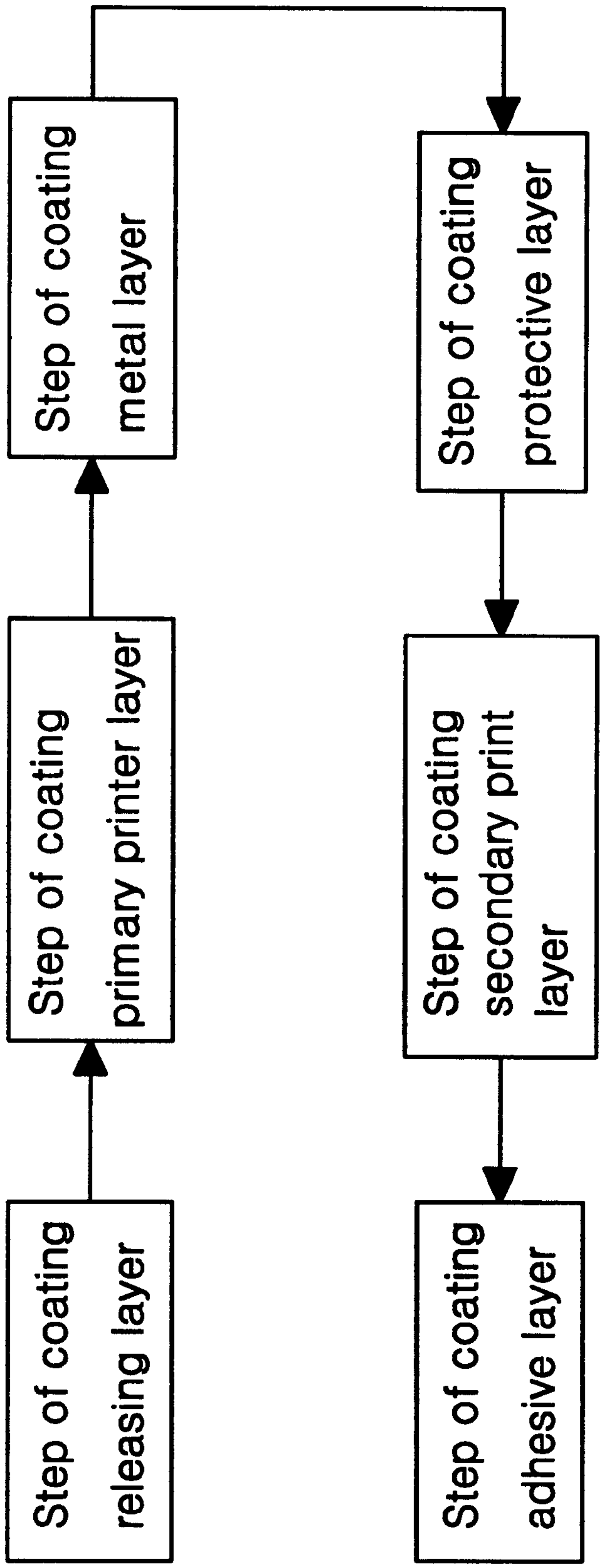
FIG. 2 shows the flow diagram for manufacturing a dissolution type thermal transfer film according to the invention.

The dissolution type transfer film for three dimensional patterns according to the invention is in the form of laminate consisting of 7 layers, as shown in FIG. 1.

As the base film, a glazed or unglazed and thermally stable polyester-based, polypropylene-based or polyvinylchloride-based film, or otherwise one or more of the aforementioned three types of films coated with mat agent for unglazed property may be used. A releasing layer 2 is formed by uniformly coating, on the base film 1 of a solution type transfer film A, a composition of acryl-based resin(e.g. MMA) dissolved in a solvent based on ketone, acetate or toluene. This releasing layer 2 functions to induce peeling property between the primary layer 3 and the base film 1. As the case may be, the releasing layer may be dispensed with. Preferably the resin weight of the releasing layer may amount to 15 to 20 wt. %.

Then the primary print layer 3 is formed in a thin film by coating a mixture which is prepared by dissolving a water-soluble acryl resin, water-soluble or alcoholic vinyl resin in a solvent like methanol, ethanol, IPA or water and uniformly dispersing an arbitrarily chosen weatherproof pigment therein to prepare an ink. After the primary print layer is dried, an ink made of bronze powder, aluminum powder and aluminum paste is coated or otherwise a metal film is vapor-deposited on the primary print layer, so that a metal layer 4 may be formed to impart an excellent decorative effect of appearance. In order to protect the underside print layer against dissolution by a solvent, a mixture including acryl resin or acrylicurethane resin, as the main component, mixed with a ketone-based solvent, an acetate-based solvent, or alcoholic solvent and also with a curing agent is coated on the metal layer 4 to provide a protective layer 5. The weight of resin for the above-described primary print layer preferably amounts to 25 to 30 wt. %.

Thereafter, a thin secondary print layer 6 is laminated on the protective layer 5 by coating a composition which is also prepared by using acryl-based(MMA) resin or vinyl resin, small amount of additive and pigment, and a solvent such as ketone-based solvent, acetate-based solvent or toluene. Finally, an adhesive layer 7 based on acryl-based(MMA) resin as the main component is formed on the secondary print layer 6 to provide the dissolution-type thermal transfer film according to the present invention.

The thermal transfer film can be transferred, with the adhesive layer facing the article, to the desired location on a wooden article or plastic molded product, wherein a pressing roller is rolled on the thermal transfer film at a speed of about 3 to 5 m/min at a temperature of about 130° C. and subsequently dissolution steps by using the primary and secondary solvents follow to provide decorative patterns with desired shapes or expressions. In the above process, the adhesive layer may be uniformly coated on the laminate already formed by employing a gravure cylinder.

In the following, the invention will be described in detail by means of working example.

EXAMPLE

On a polyester film, polypropylene film or polyvinylchloride film, or one of these kinds of films coated with a mat agent, i.e. a unglazed film, having the thickness of 12 to 25 microns, a releasing film (having the resin weight of 15 wt. %), a primary print layer of water-soluble or alcoholic resin (having the resin weight of 25 wt. %), a metal powder or metallic vacuum vapor-deposited layer, a thermal setting protective layer, a secondary print layer and an adhesive layer are successively laminated to provide a dissolution type transfer film for three dimensional patterns according to the present invention.

Now, the transfer film so prepared is easily and rapidly transferred to an article for decoration by press-rolling the film on the article at a temperature of about 130° C. and at the roller speed of about 5 m/min. Subsequently a primary dissolution step is conducted, wherein the print layer 2 of water-soluble or alcoholic resin is partially dissolved by a first designated solvent in a desired manner and then a metal powder or metallic vacuum vapor-deposited layer 4 is also partially dissolved by a second designated solvent to result in a desired final form of pattern. As the final step, drying is conducted.

COMPARATIVE EXAMPLE

First a predetermined color is sprayed on an article for decoration and fully dried, then a secondary spraying operation with gold and silver powder is conducted and fully dried, and as the next step, a water-soluble paint is sprayed on the metal powder layer, followed by a perfect drying. Subsequently, a primary dissolving and washing is conducted to partially dissolve the water-soluble paint layer and a perfect drying is followed. Then, a secondary dissolving and washing is conducted to remove the unnecessary part of the gold and silver layer to provide a desired product.

The overall process requires much longer time than the corresponding process part in the case related with the present invention.

As described above, the present invention rests on the process of adhering a thermal transfer film in the dry state by using only heat and pressure and subsequently removing the surplus portions from the printed layers by using two dissolution steps in forming a variety of three dimensional patterns on a picture frame, furniture, architectural interior parts and so on of wood or plastic molded materials, whereby a marked economical effect is attained, mainly due to the simplification of the process, beside the excellent surface patterns.

What is claimed is:

1. A dissolution type thermal transfer film for three dimensional patterns, comprising: a base film consisting of polyester, polypropylene or polyvinylchloride without a mat agent or coated on one side of the base film with a mat agent to provide an unglazed film, an optional releasing layer based on acrylic resin as tile main component having separability to be mounted on the top of the base film, a print layer made of a water-soluble acryl-based resin, or water-soluble or alcoholic vinyl-based resin having dissolving power, a metal powder-printed layer or metallic vapor-deposited layer, a thermosetting protective layer, a secondary acryl-based print layer and finally an adhesive layer coated in that order.

* * * * *